O. W. SCHAUM.
LATHE.
APPLICATION FILED JAN. 31, 1910.
1,001,993.
Patented Aug. 29, 1911.
2 SHEETS—SHEET 1.
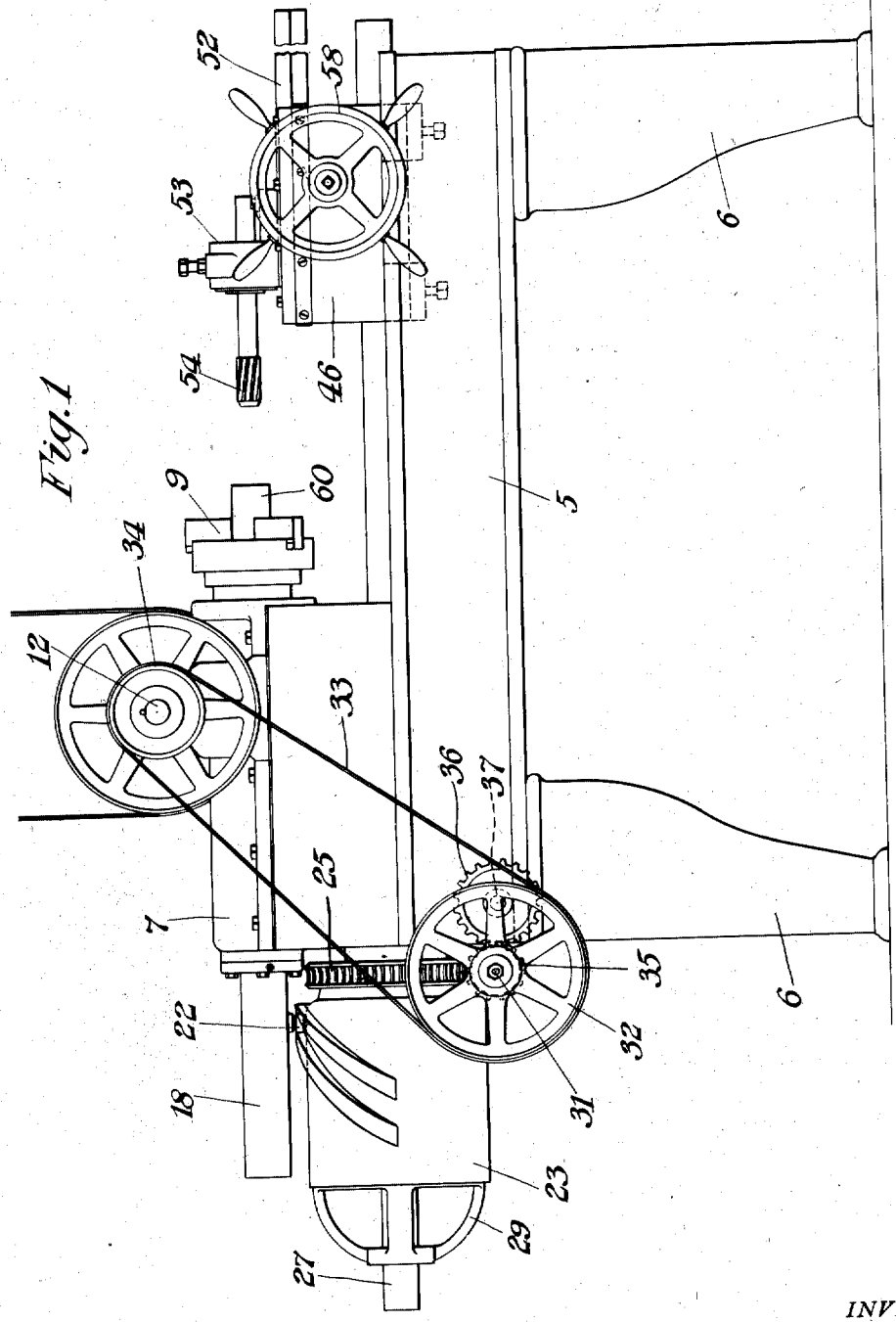

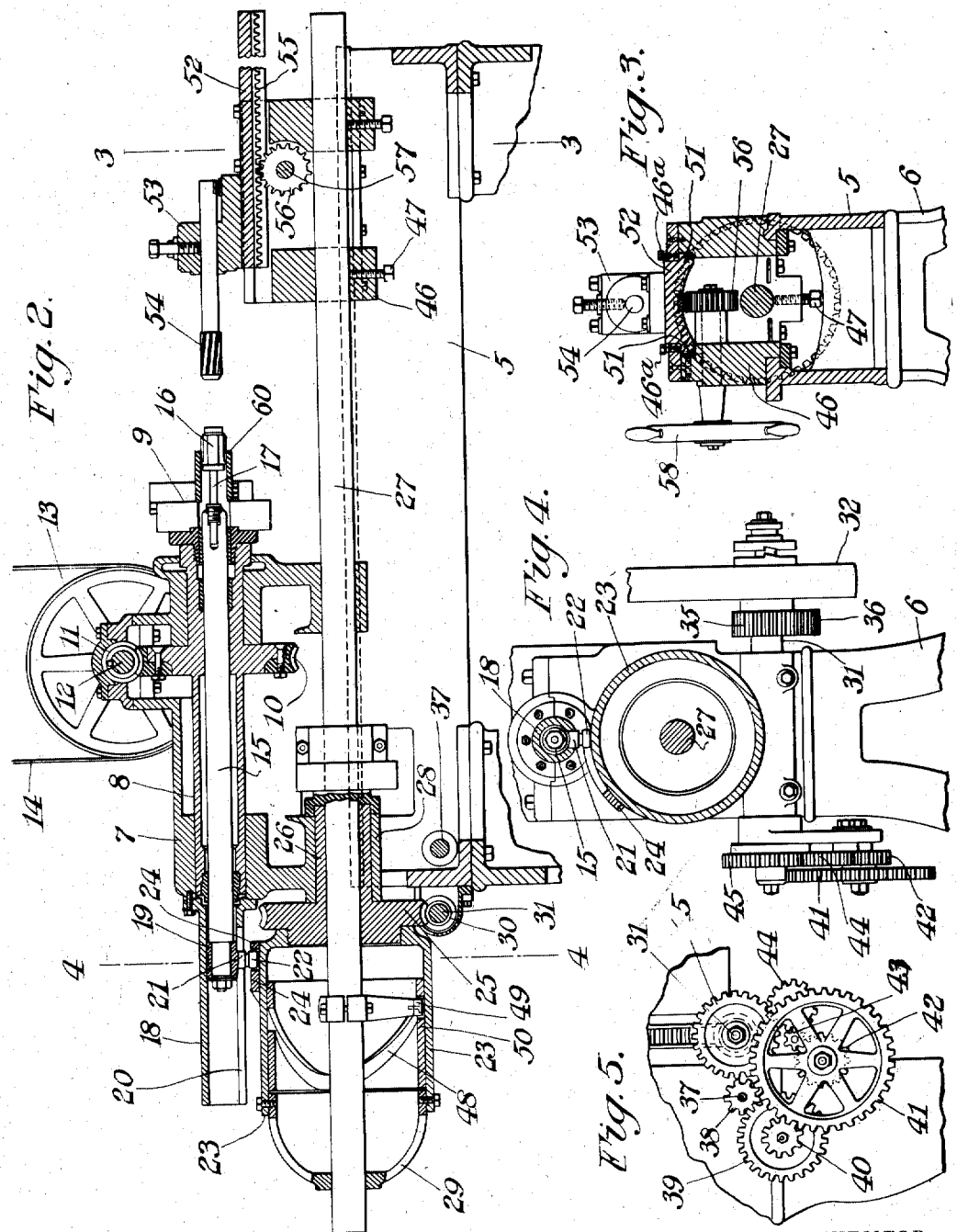

UNITED STATES PATENT OFFICE.

OTTO W. SCHAUM, OF PHILADELPHIA, PENNSYLVANIA, ASSIGNOR TO FAY MACHINE TOOL COMPANY, OF PHILADELPHIA, PENNSYLVANIA, A CORPORATION OF PENNSYLVANIA.

LATHE.

1,001,993.  Specification of Letters Patent.  Patented Aug. 29, 1911.

Application filed January 31, 1910. Serial No. 540,940.

*To all whom it may concern:*

Be it known that I, OTTO W. SCHAUM, a citizen of the United States, and resident of Philadelphia, in the State of Pennsylvania, have invented certain new and useful Improvements in Lathes, of which the following is a full, clear, and exact description, reference being had to the accompanying drawings, forming a part of this specification.

My invention relates to that class of machine tools commonly known as lathes, wherein are employed a rotatable shaft, a holder carried by the shaft and adapted to hold and rotate the work or blank to be treated, cutting tools movable relatively to the work holder and to each other, and means for moving the cutting tools to act upon the work or blank carried by the holder during the rotation thereof, whereby a multiplicity of operations may be simultaneously performed upon the same work or blank. In operating upon blanks of various kinds in machines of this character, it frequently becomes necessary, in order to save time in finishing the blank to operate a cutting tool from the side of the work or blank occupied by the shaft which is rotating the blank, thereby permitting other cutting tools to be operated from other sides of the blank.

The object of my invention, as generally stated, is to provide a lathe with a hollow shaft carrying a work holder and means for rotating the same in combination with a tool holder and means for operating the tool holder through the hollow shaft by mechanism of the lathe during the rotation of the hollow shaft; and a further object of the invention is to provide, in addition to the tool holder operated through the hollow shaft, a simple and efficient means for supporting and operating another tool holder or holders relatively to the work holder during the operation of the lathe.

The invention is adapted to be used in connection with the mechanism of the lathe disclosed in Letters Patent of the United States No. 910,466, dated January 19, 1909, to which reference may be had; and the invention also may be employed in connection with other lathes of similar character.

One form of embodiment of the invention is illustrated in the accompanying drawings which will be hereinafter fully described, following which the precise nature of the invention will be particularly pointed out in the claims.

In the drawings:—Figure 1 is a side elevation of a lathe embodying my invention. Fig. 2 is a longitudinal vertical section thereof, partly broken away. Fig. 3 is a transverse section on line 3—3 of Fig. 2. Fig. 4 is a transverse section on line 4—4 of Fig. 2. Fig. 5 is an elevation of a portion of the side frame of the machine opposite to the side shown in Fig. 1, showing the speed reducing gears.

The main frame of the lathe may be of any desired form, and as illustrated in the drawings it comprises the bed 5 and the supporting standards 6 therefor. Rising from one end of the bed 5 is the head stock 7 in which is mounted a hollow rotatable shaft 8 constituting the lathe spindle. The inner end of the hollow shaft or spindle 8 is provided with a chuck 9 or other suitable device adapted to receive and hold the work or blank to be acted upon by the cutting tools of the lathe, and cause the work or blank to be rotated by the spindle 8 while being acted upon by the cutting tools.

The chuck or work holder 9 may be of any desired form to meet any desired requirements, and it may be modified to meet the various requirements of different blanks to be acted upon by the machine.

Formed on or secured to the hollow shaft or spindle 8 is a worm wheel 10 engaged by a worm 11 on the main driving shaft 12 which is mounted to rotate in suitable bearings on the head stock 7. The driving shaft 12 is provided with a pulley 13 driven by a belt 14 from an outside source of power. It will thus be seen that when the shaft 12 is rotated, the worm 11 will slowly rotate the worm wheel 10 and therewith the hollow shaft or spindle 8 carrying the work holder 9.

Mounted to slide longitudinally within the hollow shaft 8 is a shaft or tool holder 15 the inner end of which carries a cutting tool 16 which may be of any desired form to meet any desired requirement. As illustrated in the drawings, the cutting tool 16 is a reamer provided with a shank 17 which is screw-threaded and screwed into the inner end of the shaft or tool holder 15. The outer end of the shaft or tool holder 15 extends beyond the outer end of the hollow shaft or spindle 8 and into a sleeve 18 arranged in axial alinement with the shaft 8 and having its inner end secured to the head stock 7 or main frame of the machine. The outer end of the shaft or tool holder 15 is reduced and has secured thereto a collar 19 arranged to slide within the sleeve 18 during the longitudinal movement of the shaft or tool holder 15. Projecting downwardly from the collar 19 and through a longitudinal slot 20 in the sleeve 18 is an arm 21 which is adapted to engage the side walls of the slot 20 and prevent the rotation of the tool holder 15 while permitting longitudinal movement thereof. The lower end of the arm 21 is provided with a roller 22 arranged directly above a hollow rotatable cam carrier or cylinder 23, the outer face of which is provided with suitable cams 24 adapted to engage the roller 22 and move the shaft or tool holder 15 longitudinally within the shaft or spindle 8 during the rotation of the cam carrier. The cam carrier 23 is formed on or secured to a worm wheel 25 provided with a hub or sleeve 26 which surrounds a shaft 27 and is mounted to rotate in a bearing 28 on the main frame of the machine. The outer end of the cam carrier 23 is provided with a suitable brace 29 which surrounds the shaft 27. The worm wheel 25 is engaged by a worm 30 fixed to a transverse shaft 31 which is mounted in suitable bearings on the main frame. Loosely mounted on the shaft 31 is a pulley 32 driven by a belt 33 from a pulley 34 on the main shaft 12.

The shaft 31 may be actuated direct from the pulley 32 or it may be actuated through a set of speed-reducing gears as follows: Formed on or secured to the hub of the pulley 32, is a pinion 35 which coacts with a gear wheel 36 on one end of a shaft 37 which extends transversely through the bed 5 of the machine and is journaled in bearings therein. The other end of the shaft 37 is provided with a pinion 38 coacting with a gear wheel 39 the hub of which carries a pinion 40 which coacts with a gear wheel 41. The hub of the gear wheel 41 is provided with a gear wheel 42 coacting with a pinion 43. This pinion 43 coacts with a gear wheel 44 which in turn coacts with a gear wheel 45 secured to the shaft 31. It will thus be seen that during the actuation of the pulley 32 from the main driving shaft 12, the shaft 31 and worm 30 will be slowly rotated, thereby slowly rotating the worm wheel 25 and therewith the cam carrier 23.

The shaft 27, hereinbefore referred to, is longitudinally movable through the machine, and it is supported by the hub or sleeve 26 of the worm wheel 25 and also by a carriage 46 which is mounted upon suitable guides on the bed 5 in a manner to be movable thereon longitudinally of the machine toward and from the chuck or work holder 9, the carriage 46 being secured to the shaft 27 by suitable screws 47. Secured to the shaft 27 within the hollow cam carrier 23 is an arm 48 carrying a roller 49. This roller 49 is arranged adjacent the inner wall of the cam carrier 23 and is adapted to be acted upon by cams 50 to move the shaft 27 and therewith the carriage 46 longitudinally of the machine during the rotation of the cam carrier 23.

The carriage 46 is provided with guides 51 extending longitudinally of the machine parallel to the shaft 27, and fitted to the guides 51 is a second carriage 52 which is movable with respect to the carriage 46. The carriage 52 is provided with a suitable tool holder 53 to which is secured a cutting tool 54, the cutting tool illustrated in the drawings being a drill, arranged in axial alinement with the cutting tool 16 and extending from the tool holder 53 toward the chuck 9. The under side of the carriage 52 is provided with a longitudinally extending gear rack 55 which is engaged by the teeth of a gear wheel 56 on a transverse shaft 57. The shaft 57 extends through and is mounted to turn in one of the side walls of the carriage 46. The outer end of the shaft 57 is provided with a suitable hand wheel 58 by means of which the shaft 57 may be turned to turn the gear wheel 56 and cause it to engage the rack 55 to adjust the carriage 52 and therewith the tool holder 53 longitudinally of the machine with respect to the carriage 46. Suitable set screws 46ᵃ are provided which extend through the carriage 46 and are adapted to engage the carriage 52 to hold it in positions of adjustment on the carriage 46.

By the construction hereinbefore described, it will be seen that the tool holder 15 may be operated from the side of the work holder 9 occupied by the spindle 8, and that the tool holder 53 may be operated from the opposite side of the work, and also that the two tool holders 15 and 53 may be both operated by the same cam carrier 23; and it will also be seen that by changing the contours of the cams 24 and 50 for controlling the movements of the tool holders 15 and 53, respectively, many different movements may be given to the tool holders with respect to each other and to the work holder 9, to perform many different operations upon the work carried by the work holder.

In the drawings, I have shown the tool holder 9 provided with the reamer 16, and the tool holder 53 provided with the drill or boring tool 54, and I have shown the machine arranged to first bore or drill a hole in a blank 60 and then ream the wall of the hole.

The chuck or work holder 9 is open at its center and the work or blank 60 is secured thereto with its center in axial alinement with the spindle 8 and cutting tools 16 and 54. When power is applied to the main driving shaft 12, the work holder 9 and therewith the work 60 is rotated at a suitable speed while the cam carrier 23 is rotated at a relatively slower speed, as previously explained. The contours of the cams 24 and 50 controlling the cutting tools 16 and 54, respectively, are such that during the rotation of the cam carrier 23 the drill 54 will be advanced through the work 60 to bore or drill a hole therein; whereupon the drill will be withdrawn from the work and the reamer 16 will be advanced through the hole to ream the wall thereof, after which the reamer 16 will be withdrawn from the hole.

In the form of embodiment of the invention shown and described herein, the shaft 31 and its actuating mechanism are precisely like the shaft "18" and the actuating mechanism therefor of the machine shown and described in U. S. Letters Patent No. 910,466, hereinbefore referred to; and when the invention is used in connection with a machine of the character shown and described in said Letters Patent, the stop motion shown and described therein may be employed to automatically stop the operation of the lathe after the cutting tools 16 and 54 have performed their operations upon the work 60.

I claim:

1. In a lathe, the combination of a supporting frame provided with a part having a slot therein, a hollow rotatable shaft, a work holder carried by the shaft, means for rotating the shaft, a tool holder within the shaft, a part projecting from the tool holder into said slot and preventing rotation of the tool holder while permitting movement of the tool holder longitudinally of the shaft, and means for automatically moving the tool holder longitudinally of the shaft during the rotation of the shaft.

2. In a lathe, the combination of a supporting frame, a hollow rotatable shaft, a work holder carried by the shaft, means for rotating the shaft, a tool holder within the shaft, a sleeve fixed to said frame and extending in axial alinement with said shaft, said sleeve having a longitudinal slot therein, a part projecting from the tool holder and into said slot, and means acting upon said part and moving said tool holder longitudinally of said shaft during the rotation of the shaft.

3. In a lathe, the combination of a supporting frame, a hollow rotatable shaft, a work holder carried by the shaft, means for rotating the shaft, a tool holder within the shaft, a sleeve fixed to said frame and extending in axial alinement with said shaft, said sleeve having a longitudinal slot therein, a part projecting from the tool holder and into said slot, a cam arranged to act upon said part and move the tool holder longitudinally of said shaft, and means for supporting and actuating the cam during the actuation of the shaft.

In testimony whereof, I have hereunto affixed my signature this 27th day of January A. D. 1910.

OTTO W. SCHAUM.

Witnesses:
A. M. BIDDLE,
R. A. DUNLAP.